(12) United States Patent
Wilkes et al.

(10) Patent No.: US 7,132,557 B2
(45) Date of Patent: Nov. 7, 2006

(54) AMINE COMPOUNDS AND CURABLE COMPOSITIONS DERIVED THEREFROM

(75) Inventors: Garth L. Wilkes, Blacksburg, VA (US); Chenghong Li, Wilmington, NC (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 10/299,411

(22) Filed: Nov. 19, 2002

(65) Prior Publication Data

US 2003/0153777 A1    Aug. 14, 2003

Related U.S. Application Data

(62) Division of application No. 09/896,082, filed on Jun. 29, 2001, now Pat. No. 6,506,921.

(51) Int. Cl.
*C07C 7/04* (2006.01)
*B05D 3/02* (2006.01)
*B32B 27/36* (2006.01)
*C08G 77/26* (2006.01)

(52) U.S. Cl. .................. 556/413; 556/425; 528/38; 427/387; 428/412; 428/447

(58) Field of Classification Search ............... 556/423, 556/413, 425; 528/38; 427/387; 428/412, 428/447
See application file for complete search history.

(56) References Cited

U.S. PATENT DOCUMENTS

| 3,986,997 | A |   | 10/1976 | Clark .................. 260/29.2 |
| 4,027,073 | A |   | 5/1977  | Clark .................. 428/412 |
| 4,177,315 | A |   | 12/1979 | Ubersax ............... 428/336 |
| 4,277,287 | A |   | 7/1981  | Frye .................. 106/287.12 |
| 4,495,360 | A |   | 1/1985  | Anthony .............. 556/436 |
| 4,746,366 | A |   | 5/1988  | Philipp et al. ....... 106/287.19 |
| 5,206,285 | A | * | 4/1993  | Castellucci .......... 524/588 |
| 5,316,855 | A |   | 5/1994  | Wang et al. .......... 428/447 |
| 5,371,261 | A |   | 12/1994 | Wang et al. .......... 556/421 |
| 5,792,383 | A |   | 8/1998  | Reyes-Gavilan et al. ..... 252/68 |
| 6,072,018 | A |   | 6/2000  | Wilkes et al. ........ 528/28 |
| 6,506,921 | B1 | * | 1/2003  | Wilkes et al. ........ 556/413 |

FOREIGN PATENT DOCUMENTS

| DE | 19840009 |   | 3/2000 |
| EP | 0570173  |   | 11/1993 |
| JP | 53135621 | * | 11/1978 |

OTHER PUBLICATIONS

Chem Abstracts 1979:130,686, RN-69656-19-5.*
Chem. Abstracts 2001:349091 (Abstract of JP2001131243 May 15, 2001) Osaki et al, rn=339322-80-4.*

* cited by examiner

*Primary Examiner*—Samuel Barts
(74) *Attorney, Agent, or Firm*—Fish & Richardson P.C.

(57) ABSTRACT

Disclosed are compounds produced by a process comprising the step of reacting an amine reactant with an epoxide reactant to form a hydrolytically stable carbon-nitrogen bond therebetween, wherein at least one of the amine or epoxide reactants comprises a terminal alkoxysiyl group. Also disclosed are curable compositions comprising the compounds of the present invention and the cured products derived therefrom.

7 Claims, No Drawings

AMINE COMPOUNDS AND CURABLE COMPOSITIONS DERIVED THEREFROM

CROSS REFERENCE TO RELATED APPLICATIONS

This application is a divisional of pending U.S. patent application Ser. No. 09/896,082, filed Jun. 29, 2001, now U.S. Pat. No. 6,506,921 issued on Jan. 14, 2003, which is hereby incorporated by reference in its entirety.

FIELD OF INVENTION

The present invention relates generally to amine compounds that find particular use in the sol-gel preparation of curable, high abrasion-resistant coating compositions. The present invention further relates to methods of making such amine compounds, curable compositions comprising the amine compounds, methods of curing such compositions and the cured products derived therefrom.

BACKGROUND OF THE INVENTION

High abrasion-resistant coating compositions find use in a wide variety of coatings applications. Because such compositions form coatings which tend to increase the hardness and abrasion resistance of substrates, they are desirable for use in protecting the surfaces of said substrates. For example, high abrasion resistant coating compositions are used in the manufacture of transparent articles, including building windows, aircraft windows, eyeglasses, and lenses, to prevent dulling, pitting and scratching of the surfaces thereon. Additionally, high abrasion resistant coating compositions are used to help metal substrates, such as those made from aluminum, maintain physical and structural qualities.

A useful class of such high abrasion resistant coating compositions are those derived via sol-gel procedures. Traditionally, such coating compositions have been produced by reacting one or more inorganic alkoxysilane compounds to form a curable composition comprising a network of siloxane bonded (—Si—O—Si—) moieties.

More recently, alkoxysilated amine compounds have been used in conjunction with inorganic compounds to form high abrasion resistant coating compositions via sol-gel procedures. For example, U.S. Pat. Nos. 5,316,855 and 5,371,261, issued to Wilkes et al., disclose the use of alkoxysilylated organic compounds containing urea (—NH—C(O)—NH—) and/or urethane (—NH—C(O)—O—) bonds in the preparation of sol-gel derived curable compositions. Such organic compositions are reacted with metal alkoxide or semi-metal alkoxide compounds to form curable compositions.

The present inventors have discovered that the use of organic compounds containing urea (—NH—C(O)—NH—) and/or urethane (—NH—C(O)—O—) bonds in curable compositions is disadvantageous for several reasons. For example, one disadvantage is that organic compounds containing urea and urethane moieties are susceptible to hydrolysis. The hydrolysis of such compounds in the water-alcohol borne sol-gel compositions leads to "dangling" side groups, which lowers the abrasion resistance of the resulting coatings. In addition, the hydrolysis raises the pH of such compositions which, in turn, shortens gelling time and reduces the shelf life of the compositions.

Recognizing these and other drawbacks of the prior art, the present inventors have perceived a need for new, stable alkoxysilated organic compounds for use in a variety of applications, especially sol-gel coatings applications. These and other objects are achieved by the present invention as described below.

SUMMARY OF THE INVENTION

The present invention is directed to a family of alkoxysilated amine compounds which find particular use in the preparation of coating compositions, especially those formed via sol-gel techniques, for use in various coatings applications. The amine compounds of the present invention overcome the disadvantages of the prior art by incorporating hydrolytically stable moieties which, when forming curable compositions, can be more readily exposed to water without risk of reduced shelf life. Moreover, the amine compounds of the present invention can be used to prepare curable compositions and coatings/films having longer shelf lives and greater abrasion resistance than those of the prior art.

According to one aspect of the present invention, provided are compounds produced by a process comprising the step of reacting an amine reactant with an epoxide reactant to form a hydrolytically stable carbon-nitrogen bond therebetween, wherein at least one of the amine or epoxide reactants comprises a terminal alkoxysiyl group. In preferred embodiments, the compounds provided by the present invention are compounds described by the formula 1 below.

Formula 1:

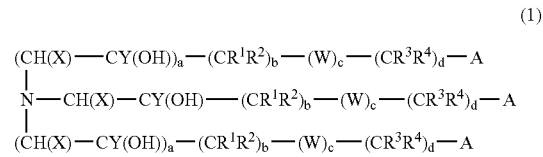

(1)

wherein:

W is independently

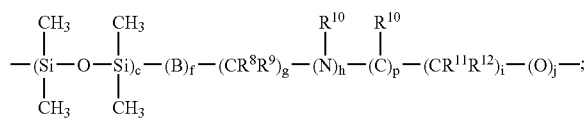

X and Y are independently hydrogen or lower alkyl, or independently X and Y are linked to form a cycloalkyl moiety;

$R^{10}$ is independently —$(CR^{13}R^{14})_k$—$(O)_l$—$(CR^{15}R^{16})_m$-A;

A is independently lower alkyl or —$Si(R^5)(R^7)OR^6$ provided at least one A is —$Si(R^5)(R^7)OR^6$;

B is independently oxygen, —O—$(CR^{17}R^{18})_n$—O—, a substituted or unsubstituted cycloalkylene radical, a substituted or unsubstituted arylene radical, a substituted or unsubstituted aralkylene radical, wherein any of said cycloalkylene, arylene or aralkylene radicals may be further substituted with N, O, or S heteroatoms;

$R^5$ and $R^7$ are independently hydroxyl, lower alkyl or lower alkoxy;

$R^1$, $R^2$, $R^3$, $R^4$, $R^8$, $R^9$, $R^{11}$, $R^{12}$, $R^{13}$, $R^{14}$, $R^{15}$, $R^{16}$, $R^{17}$ and $R^{18}$ are independently hydrogen, hydroxyl, lower alkyl or lower alkoxy;

a, c, e, f, h, j, l and p are independently 0 or 1;

b, d, g, i, k, m and n are independently about 0 to about 8.

Another aspect of the present invention is a family of curable compositions containing the compounds of the present invention. Accordingly, the curable compositions of the present invention comprise at least one amine produced by a process comprising the step of reacting an amine reactant with an epoxide reactant to form a hydrolytically stable carbon-nitrogen bond therebetween. In preferred embodiments, the curable compositions of the present invention comprise at least one amine compound of formula (1).

The curable compositions of the present invention are useful in the manufacture of abrasion-resistant coatings. Therefore, yet another aspect of the present invention is a method for producing a substrate having an abrasion-resistant coating comprising the steps of: (a) applying a layer of the curable composition of the invention onto a substrate; and (b) curing the curable composition on the substrate.

The inventive method produces articles of manufacture having abrasion-resistant coatings. Therefore, still another aspect of the present invention is a substrate having an abrasion-resistant coating produced via the method of the present invention.

The curable compositions comprising amine compounds of the present invention may be cured to form films. Therefore, the present invention also includes the films produced by curing the curable compositions comprising at least one amine compound of the present invention.

DESCRIPTION OF THE INVENTION AND PREFERRED EMBODIMENTS

As employed above, and throughout the disclosure, the following terms, unless otherwise indicated, shall be understood to have the following meanings:

"Alkyl" means a straight-chain or branched aliphatic group. Preferred alkyls are those having from about 1 to about 20 carbon atoms. "Lower alkyl" is an alkyl group having from about 1 to about 6 carbon atoms and is most preferred. Examples of lower alkyl groups are methyl, ethyl, n-propyl, isopropyl, butyl, sec-butyl, tert-butyl, n-pentyl, isopentyl, neopentyl, and n-hexyl.

"Alkylene" means a divalent straight-chain or branched aliphatic group. Preferred alkylenes are those having from about 1 to about 20 carbon atoms. "Lower alkylene" is an alkylene group having from about 1 to about 6 carbon atoms and is most preferred. Examples of lower alkyl groups are methylene, ethylene, n-propylene, isopropylene, butylene, sec-butylene, tert-butylene, n-pentylene, isopentylene, neopentylene, and n-hexylene.

"Alkoxy" means an aliphatic group comprising an alkyl group attached to an oxygen radical. Preferred alkoxys are those having from about 1 to about 20 carbon atoms. "Lower alkoxy" is an alkoxy group having from about 1 to about 6 carbon atoms and is most preferred. Examples of lower alkoxy groups are methoxy, ethoxy, n-propoxy, isopropoxy, butoxy, sec-butoxy, tert-butoxy, n-pentoxy, isopentoxy, neopentoxy, and n-hexoxy.

"Alkoxysilyl" means a tri-substituted silyl group comprising at least one to about three alkoxy groups wherein any non-alkoxy substituents are hydroxyl or lower alkyl. Preferred alkoxysilyls are those having three lower alkoxy substituents.

"Amine-functional silane" means a compound comprising at least one amine group and at least one terminal alkoxysilane group.

"Amine reactant" means a compound comprising at least one amine group which is capable of reacting with an epoxide reactant to form a hydrolytically stable carbon-nitrogen bond therebetween. Preferred amine reactants include mono-, di-, and tri amines, amine-functional silanes, and combinations of two or more thereof.

"Cycloalkyl" means a cyclic aliphatic group. Preferred cycloalkyls are those having from about 3 to about 20 carbon atoms. Examples of preferred cycloalkyls are cyclopropyl, cyclobutyl, cyclopentyl, cyclohexyl, cycloheptyl, cyclooctyl, cyclononyl, cyclodecyl, cycloundecyl, and cyclododecyl.

"Epoxy-functional silane" means a compound comprising at least one terminal epoxy group and at least one terminal alkoxysilane group.

"Epoxide reactant" means a compound comprising at least one epoxy group which is capable of reacting with an amine reactant to form a hydrolytically stable carbon-nitrogen bond therebetween. Preferred epoxy reactants include compounds comprising two or more epoxy groups, epoxy functional silanes, and combinations of two or more thereof.

"Hydrolytically stable" means an organic moiety or group which does not substantially react with water in a neutral, weakly acidic or weakly basic medium over a time period of up to about 3–6 months.

"Hydroxyalkyl" means an alkyl group having at least one hydroxyl substituent attached thereto. Preferred hydroxyalkyls are those having from about 1 to about 20 carbon atoms. "Lower hydroxyalkyl" is a hydroxyalkyl group having from about 1 to about 6 carbon atoms and is most preferred. Examples of lower hydroxyalkyls are hydroxymethyl, hydroxyethyl, hydroxy n-propyl, hydroxyisopropyl, hydroxybutyl, hydroxy sec-butyl, hydroxy tert-butyl, hydroxy n-pentyl, hydroxyisopentyl, hydroxyneopentyl, and hydroxy n-hexyl.

"Hydroxyalkylene" means an alkylene group having at least one hydroxyl substituent attached thereto. Preferred hydroxyalkyls are those having from about 1 to about 20 carbon atoms. "Lower hydroxyalkyl" is a hydroxyalkyl group having from about 1 to about 6 carbon atoms and is most preferred. Examples of lower hydroxyalkyls are hydroxymethyl, hydroxyethyl, hydroxy n-propyl, hydroxyisopropyl, hydroxybutyl, hydroxy sec-butyl, hydroxy tert-butyl, hydroxy n-pentyl, hydroxyisopentyl, hydroxyneopentyl, and hydroxy n-hexyl.

"Independently" means a given variable which appears at more than one location in a chemical formula may be the same or different at each location in the formula.

Amine Compounds

The amine compounds of the present invention comprise generally compounds formed by a process comprising the step of reacting an amine reactant with an epoxide reactant to form a hydrolytically stable carbon-nitrogen bond therebetween, wherein at least one of the amine reactant or epoxide reactant comprises a terminal alkoxysilyl group. Although applicants do not intend to be bound by or to any particular theory of operation, scheme 1, illustrated below, shows generally one possible mechanism for the reaction of an amine reactant with an epoxide reactant to form a carbon-nitrogen bond of the present invention.

Scheme 1:

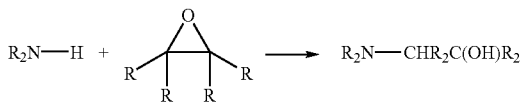

wherein R is independently hydrogen, unsubstituted or substituted aliphatic, or unsubstituted or substituted aromatic groups, and/or wherein two R groups of the epoxide and/or the two R groups of the amine compound may be linked to form cyclic compounds.

Any of a wide range of amine/epoxide reactions can be used in the practice of the present invention. According to certain preferred embodiments, compounds of the present invention are prepared by reacting a mono-, di- or triamine starting material, or a combination of two or more thereof, with an epoxy functional silane in a lower alcohol solution. For example, Scheme 2 illustrates one possible mechanism for the formation of a compound of the present invention by reacting ammonia with 3-glycidoxypropyltrimethoxysilane in the presence of ethanol (not shown).

Scheme 2:

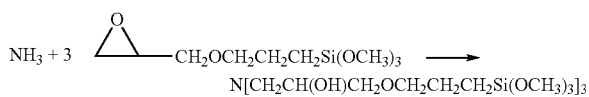

Any of a wide range of amines can be used in the preparation of the compounds of the present invention. Examples of suitable amines include ammonia, 3-aminopropyltriethoxysilane, 3-aminopropyltriethoxysilane, ethylene diamine, hexamethylene diamine, 1,3-aminopropane, 1,2-diaminopropane, 1,4-diaminobutane, 1,5-diaminopentane, 1,3-bis(3-aminopropyl)-tetramethyldisiloxane, N-(3-trimethoxysilylproyl)-ethylenediamine, diethylenetriamine, triethylenetetraamine, isophorone diamine, and the like. Such compounds are generally available commercially (for example, ammonia, ethylene diamine, hexamethylene diamine, 1,3-aminopropane, and 1,2-diaminopropane from Aldrich Chemical and 3-aminopropyltriethoxysilane, 3-aminopropyltriethoxysilane, 1,3-bis(3-aminopropyl)-tetramethyldisiloxane, and N-(3-trimethoxysilylproyl)-ethylenediamine from Gelest Inc.) and many of such compounds are known in the literature and are obtainable by art-recognized procedures.

Epoxy functional silane compounds suitable for use in the present invention include any epoxy functionalized silane compounds capable of reacting with an —NH group to form a —NCH$_2$CH(OH)— moiety. Examples of suitable epoxy functional silane compounds include 3-glycidoxypropyltrimethoxysilane, 3-glycidoxypropyldimethoxysilane, 3-glycidoxypropyldimethylmethoxysilane, 2-(3,4-epoxycyclohexyl)-ethyltriemthoxysilane and the like. Such compounds are generally available commercially (for example, 3-glycidoxypropyltrimethoxysilane from Aldrich Chemical and 3-glycidoxypropyltrimethoxysilane and 2-(3,4-epoxycyclohexyl)-ethyltriemthoxysilane from Gelest Inc.) and many of such compounds are known in the literature and are obtainable by art-recognized procedures.

Those skilled in the art will appreciate that the amounts of amine and epoxy functional silane compounds to be used according to the present invention will depend on many variables, including the particular amine being used and the desired yield from the reaction. The amount of reagents used is preferably an amount effective to achieve a greater than 50%, preferably greater than 70%, and more preferably at least about 90% conversion of the amine starting material to desired amine product. Generally, the ratio of amine N—H moieties to epoxy groups may vary from about 2:1 to about 1:2. Preferably, the ratio of N—H moieties to epoxy groups is from about 1.1:1 to about 1:1.1, and even more preferably from about 1:1.05 to about 1:1.1. For example, in certain preferred processes in which the amine is ethylenediamine (4 N—H moieties per molecule) and the epoxy functional silane is 3-glycidoxypropyltrimethoxysilane (one epoxy group per molecule) the equivalent ratio of N—H group to epoxy group is from about 2:1 to about 1:2, preferably from about 1.1:1 to about 1:1.1, and even more preferably from about 1:1.05 to about 1:1.1.

In addition to the amine and epoxy functional silane compounds, the reaction mixture preferably includes a suitable lower alcohol solvent. Examples of suitable lower alcohol solvents are methanol, ethanol, isopropanol, and the like. In preferred embodiments of the present invention, the solvent is ethanol. The amount of alcohol solvent used is preferably at least about 20 wt % by weight of the reaction mixture. In more preferred embodiments the amount of alcohol solvent used is at least about 30 wt %, and even more preferably at least about 50 wt %.

Those skilled in the art will appreciate that the conditions under which the reaction occurs, including the temperature, pressure and period of reaction, will depend on numerous factors, including the particular starting reagents used and the desired reaction yield. In view of the teachings contained herein, those skilled in the art will be able to select the appropriate reaction conditions to achieve the particular desired result. For example, for preferred embodiments in which the amine reactant is ethylenediamine and the epoxy functional silane is 3-glycidoxypropyltrimethoxysilane, the reaction is preferably carried out at a temperature of from about 0° C. to about 130° C., more preferably from about 0° C. to about 100° C., and even more preferably from about 0° C. to about 70° C. For such embodiments, the reaction pressure is preferably from about 1 atmosphere (atm) to about 10 atm, more preferably from about 1 atm to about 2 atm, and even more preferably from about 1 atm to about 1.2 atm. Also, for such embodiments, the reaction time typically varies from about 1 day to about 20 days depending on the reaction temperature and pressure. For a molar ratio of ethylenediamine to 3-glycidoxypropyltrimethoxysilane of about 1:4.1 in and ethanol solvent (50 wt %), the reaction time is typically 10–20 days at room temperature (15–25° C.) and 2–4 days at 60° C.

According to certain alternative preferred embodiments, the amine compounds of the present invention may be prepared by reacting an epoxide reactant containing two or more epoxy or glycidoxy groups with an amine functional silane compound. For example, Scheme 3 shows the synthesis of a compound of the present invention using 3-(N-methylamino)propyltriethoxysilane and 1,2,7,8-diepoxyoctane as amine functional silane and epoxide reactants, respectively.

Scheme 3:

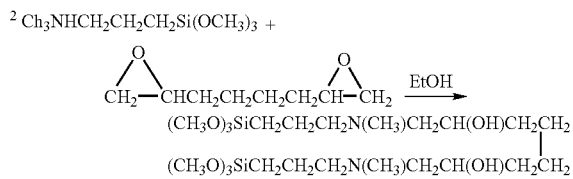

A wide range of epoxide compounds are suitable for use in the preparation of the compounds of the present invention. Examples of such suitable compounds include 1,2,7,8-diepoxyoctane, N,N-diglycidyl-4-glycidyloxyaniline, 4,4'-methylenebis(N,N-diglycidyl)aniline, triphenylolmethyl triglycidyl ether, triglycidyl isocyanurate, bisphenol-A diglycidyl ether, 2-(3,4-epoxycyclohexyl)ethyltrimethoxysilane, phenol formaldehyde-epoxides, and the like. Preferred epoxide compounds include compounds comprising two or more epoxy or glycidoxy groups, such as, for example, 1,2,7,8-diepoxyoctane, N,N-diglycidyl-4-glycidyloxyaniline, 4,4'-methylenebis(N,N-diglycidyl)aniline, tris(2,3-epoxypropyl) isocyanate, triphenylolmethyl triglycidyl ether, triglycidyl isocyanurate, bisphenol-A diglycidyl ether. Such compounds are generally available commercially (for example, 1,2,7,8-diepoxyoctane, N,N-diglycidyl-4-glycidyloxyaniline, 4,4'-methylenebis(N,N-diglycidyl)aniline, tris(2,3-epoxypropyl) isocyanate, triphenylolmethyl triglycidyl ether, triglycidyl isocyanurate, bisphenol-A diglycidyl ether from Aldrich Chemical.) and many of such compounds are known in the literature and are obtainable by art-recognized procedures.

A wide range of amine functional silane compounds are suitable for use in the present invention. Because primary amine functional silanes, if present in large amounts, tend to lead to system gelation, the amine functional silanes of the present invention are preferably secondary amine functional silanes. Examples of suitable secondary amine functional silane compounds include 3-(N-methylamino)propyltrimethoxysilane, 3-(N-ethylamino)propyltrimethoxysilane, and the like. Such compounds are generally available commercially (for example, 3-(N-methylamino)propyltrimethoxysilane and 3-(N-ethylamino)propyltrimethoxysilane from Gelest Inc.) and many of such compounds are known in the literature and are obtainable by art-recognized procedures.

Those skilled in the art will appreciate that the amounts of starting materials to be used according to the alternative embodiment will depend on many variables, including the particular staring materials being used and the desired yield from the reaction. According to certain preferred embodiments, about one equivalent of —NH moiety compound for every epoxy group on the epoxy compound is used. Furthermore, the amount of reagents used is preferably an amount effective to achieve a greater than about 50%, preferably greater than 70%, and more preferably at least about 90% conversion of the amine starting material to desired product. For example, in certain preferred processes in which the epoxide-containing compound is triphenylolmethyl triglycidyl ether (3 epoxy groups per molecule) and the secondary amine functional silane is 3-(N-methylamino) propyltriethoxysilane (one —NH per molecule), the mole ratio of 3-(N-methylamino)propyltriethoxysilane to triphenylolmethyl triglycidyl ether is preferably from about 2:1 to about 3:1, more preferably from about 2.5:1 to about 3:1, and even more preferably from about 2.8:1 to about 2.9:1.

In addition to the amine functional silane and epoxy compounds, the reaction mixture preferably includes a suitable lower alcohol solvent. Examples of suitable lower alcohol solvents are methanol, ethanol, isopropanol, and the like. In preferred embodiments of the present invention, the solvent is ethanol. The amount of alcohol solvent used is preferably greater than about 30 wt % by weight of the reaction mixture. For most applications, a 50 wt % ethanol solvent is effective in prohibiting undesirable system gelation. Accordingly, in especially preferred embodiments, the reaction mixture of the present invention comprises at least about 50 wt % ethanol.

Those skilled in the art will appreciate that the conditions under which the reaction occurs, including the temperature, pressure and period of reaction, will depend on numerous factors, including the particular starting reagents used and the desired reaction yield. In view of the teachings contained herein, those skilled in the art will be able to select the appropriate reaction conditions to achieve the particular desired result. For preferred embodiments in which the reactants are 3-(N-methylamino)propyltriethoxysilane and triphenylolmethyl triglycidyl ether, the reaction is preferably carried out at a temperature of from about 0° C. to about 130° C., more preferably from about 0° C. to about 100° C., and even more preferably from about 0° C. to about 70° C. For such embodiments, the reaction pressure is preferably from about 1 atmosphere (atm) to about 10 atm, more preferably from about 1 atm to about 2 atm, and even more preferably from about 1 atm to about 1.2 atm. Also, for such embodiments, the reaction time is preferably from about 1 to about 20 days depending on the reaction temperature. At room temperature, the reaction time of the present invention is generally from about 5 to about 10 days. At 60–70° C., the reaction time is generally from about 2–4 days.

In certain preferred embodiments, the compounds of the present invention may be produced by reacting one or more epoxide reactants with one or more amine reactants according to the procedures discussed above. In such embodiments, the resulting compounds tend to have complex structures. However, such compounds of the present invention are all characterized in that they comprise hydrolytically stable carbon-nitrogen moities.

In general, the amine compounds of the present invention comprise at least one substituent on the amine ("amine-substituent") which has a hydroxyl group in a position beta to the amine and at least one amine-substituent, which can be the same or different from the substituent having a hydroxy group in a position beta to the amine, having a terminal alkoxysilane group. According to certain preferred embodiments, the compounds of the present invention are described by the Formula (1), below.

(1)

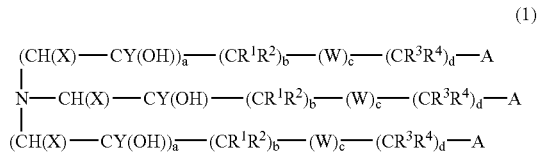

wherein:

W is independently

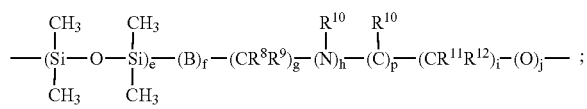

X and Y are independently hydrogen or lower alkyl, or independently X and Y are linked to form a cycloalkyl moiety;

$R^{10}$ is independently $-(CR^{13}R^{14})_k-(O)_l-(CR^{15}R^{16})_m-A$;

A is independently lower alkyl or $-Si(R^5)(R^7)OR^6$, provided at least one A is $-Si(R^5)(R^7)OR^6$;

B is independently oxygen, $-O-(CR^{17}R^{18})_n-O-$, a substituted or unsubstituted cycloalkylene radical, a substituted or unsubstituted arylene radical, a substituted or unsubstituted aralkylene radical, wherein any of said cycloalkylene, arylene or aralkylene radicals may be further substituted with N, O, or S heteroatoms;

$R^5$ and $R^7$ are independently hydroxyl, lower alkyl or lower alkoxy;

$R^1$, $R^2$, $R^3$, $R^4$, $R^8$, $R^9$, $R^{11}$, $R^{12}$, $R^{13}$, $R^{14}$, $R^{15}$, $R^{16}$, $R^{17}$ and $R^{18}$ are independently hydrogen, hydroxyl, lower alkyl or lower alkoxy;

a, c, e, f, h, j, l and p are independently 0 or 1;

b, d, g, i, k, m and n are independently about 0 to about 8.

As indicated above, X and Y groups in Formula 1 may be linked to form cycloalkyl groups. Linked X and Y groups in the compounds of the present invention form moieties having the general formula below:

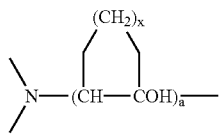

wherein x is from about 2 to about 20. Preferably, x is from about 3 to about 12, and more preferably from about 4 to about 8.

B as a substituted or unsubstituted cycloalkylene may comprise any $C_3$–$C_{20}$ cycloalkylene including, for example, cyclopropylene, cyclobutylene, cyclopentylene, methylcyclopentylene, cylcohexylene, methylcyclohexylene, dimethylcyclohexylene, cycloheptylene, cyclooctylene, or combinations of two or more thereof. Any of these groups may be substituted with, for example, alkoxy, aryloxy, alkyl, fluoroalkyl, and arylalkyl groups, and the like. In a preferred class of cycloalkylene, B is a $C_6$–$C_{10}$ cycloalkylene. In a more preferred class of cylcoalkylene, B is a $C_6$–$C_9$ cycloalkylene.

B as a substituted or unsubstituted arylene may comprise any $C_6$–$C_{20}$ arylene including, for example, phenyl, o-tolyl, m-tolyl, p-tolyl, o-xylyl, m-xylyl, p-xylyl, alpha-naphthyl, beta naphthyl, or combinations of two or more thereof. Any of these groups may be substituted with, for example, alkoxy, aryloxy, alkyl, fluoroalkyl, and arylalkyl groups, and the like. In a preferred class of arylene, B is a $C_6$–$C_{12}$ arylene. In a more preferred class of arylene, B is a $C_6$–$C_9$ arylene.

B as a substituted or unsubstituted aralkylene may comprise any $C_6$–$C_{20}$ aralkylene including, for example, benzyl, 4-methylbenzyl, o-methylbenzyl, p-methylbenzyl, diphenylmethyl, 2-phenylethyl, 2-phenylpropyl, 3-phenylpropyl or methylenediphenyl. Any of these groups may be substituted with, for example, alkoxy, aryloxy, alkyl, fluoroalkyl, and arylalkyl groups, and the like.

Furthermore any of the cycloalkylene, arylene, or aralkylene groups may be further substituted with N, O, or S heteroatoms. The heteroatoms in such groups may be incorporated into ring structures or in aliphatic carbon chains. Examples of preferred cycloalkylene, arylene, or aralkylene groups substituted with heteroatoms for use in the present invention include those of the formulae below.

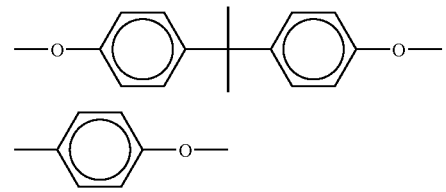

Certain preferred compounds of Formula 1 are those further described by Formula 2, below.

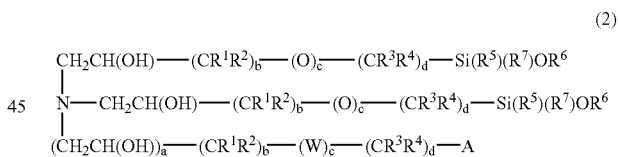

wherein b and d and independently about 1 to about 6. Furthermore, preferred compounds of Formula 2 include those described by Formula 3, below.

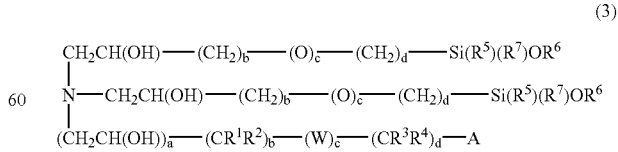

wherein b and d are independently about 1 to about 6. Preferred compounds of Formula 3 include compounds described by Formulae 4–10, below.

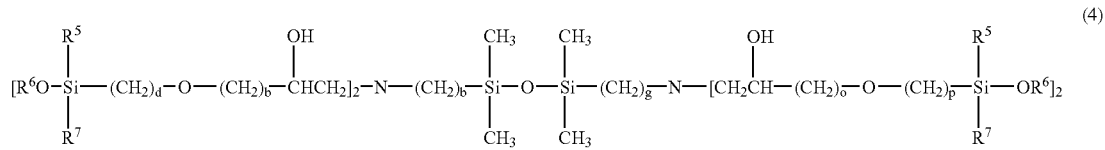
(4)
wherein b, d, g, o and p are independently about 1 to about 6;
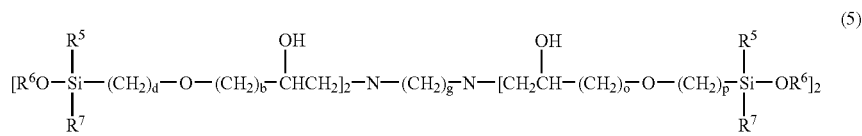
(5)
wherein b, d, g, o and p are independently about 1 to about 4;
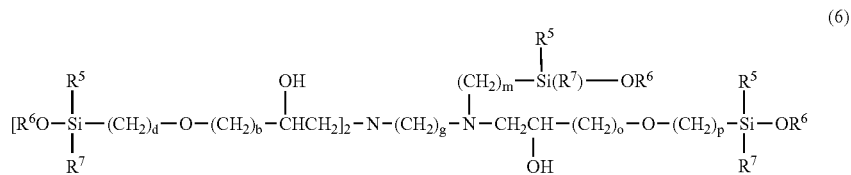
(6)
wherein b, d, g, m, o and p are independently about 1 to about 4;
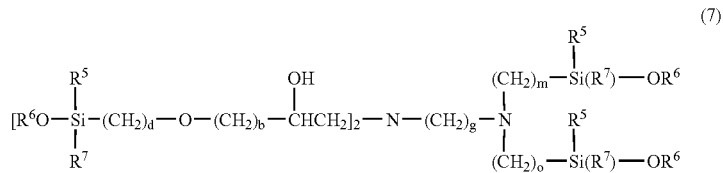
(7)
wherein b, d, g, m and o are independently about 1 to about 6;
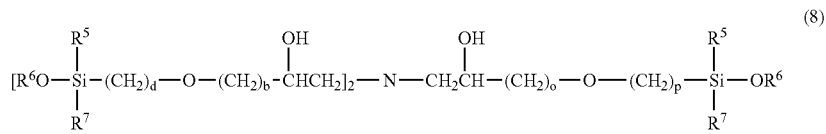
(8)

wherein b, d, o and p are independently about 1 to about 6;

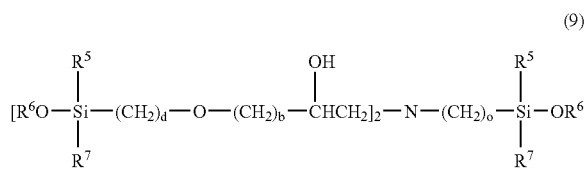

wherein b, d, and o are independently about 1 to about 6;

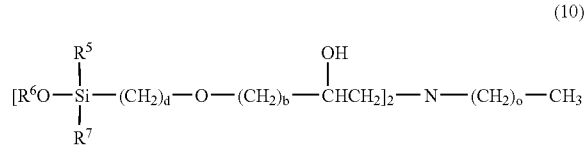

wherein b, d, and o are independently about 1 to about 6.

Illustrative examples of preferred compounds of Formula 2 (compounds A–F) are shown below.

methoxysilane, methyltriethoxysilane, 3-glycidoxypropyl-triemethoxysilane, 3-trifluoropropyltrimethoxysilane, and the like; tetraalkoxysilanes, such as, tetramethoxysilane ("TMOS"), tetraethoxysilane, tetraethoxysilane ("TEOS"), tetraisopropoxysilane, tetrapropoxysilane, tetraisobutoxysilane, tetrabutoxysilane, and the like. Any of combination of present amine compounds and alkoxysilyl or hydroxysilyl group-containing compounds may be used to form a curable composition according to the present invention. In preferred embodiments, the curable composition comprises at least one present amine compound, at least one alkyltrialkoxysilane and at least one tetraalkoxysilane.

Any suitable amounts of present amine compounds, alkyltrialkoxysilanes and tetraalkoxysilanes can be used in the practice of the present invention. Those of skill in the art will be readily able to determine the amounts of compounds to be used for various applications according to the present invention. Generally, the present amine comprises from about 0.5 to about 40 weight % of the compostion. Preferably, the amine comprises from about 2 to about 30 weight % of the compostion, and more preferably 6 to about 20 weight %. Generally, the tetraalkoxysilane comprises from about 0 to about 40 weight % of the compostion, preferably, from about 5 to about 30 weight % of the compostion, and more

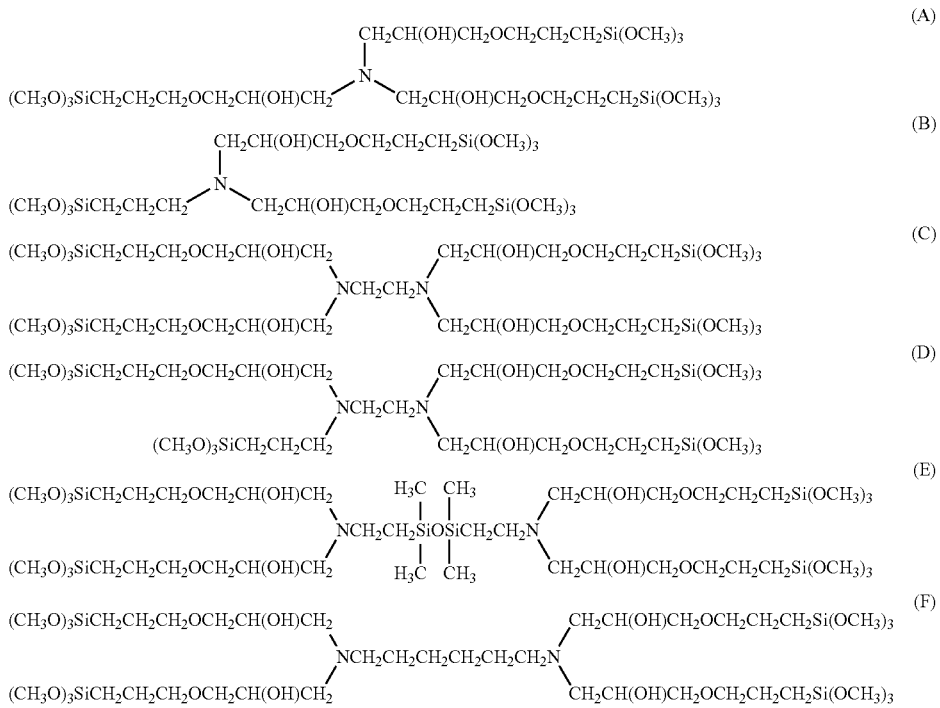

Curable Compositions

The present invention provides for curable compositions comprising at least one amine compound of the present invention. In general, the curable compositions of the present invention comprise one or more of the present amine compounds and may further comprise one or more optional organic or inorganic compound(s) comprising alkoxysilyl or hydroxysilyl groups. Examples of inorganic and organic compounds comprising alkoxysilyl or hydroxysilyl groups suitable for use in the present invention include: alkyltrialkoxysilanes, such as, phenyltrimethoxysilane, methyltripreferably 10 to about 30 weight %. Furthermore, the alkyltrialkoxysilane comprises from about 0 to about 40 weight % of the compostion, preferably, from about 2 to about 30 weight % of the compostion, and more preferably 5 to about 20 weight %.

The curable compositions of the present invention may further comprise other compounds used traditionally in sol-gel curable compositions including water, lower alcohol solvents, and/or acid or base catalysts. Suitable lower alcohols for use in the present invention include $C_1$–$C_5$ alcohols, such as, for example, methanol, ethanol, isopropanol, 2-methoxyethanol, 2-ethoxyethanol, methoxy-2-propanol, and the like. Preferred lower alcohols include ethanol and methoxy-2-propanol. Suitable acid catalysts include a number of volatile strong acids, such as, for example, hydrochloric acid, hydrobromic acid, and the like. In preferred embodiments the acid catalyst comprises hydrochloric acid. Suitable bases include, for example, sodium hydroxide, potassium hydroxide, and the like. In certain preferred embodiments, the amount of base added is a relatively small, preferably trace, amount. Additionally, in certain embodiments of the present invention, the amine moiety of the present amine compounds acts as a base catalyst in the curable compositions of the present invention.

Those of skill in the art will be readily able to determine the amounts of water and lower alcohol for use in various applications of the present invention. Generally, the amount of alcohol used in compositions of the present invention is from about 5 to about 50 weight % of the composition, preferably, from about 10 to about 50 weight %, and even more preferably, from about 25 to about 40 weight %. The amount of water used is generally from about 1 to about 50 weight % of the composition, preferably, from about 5 to about 40 weight %, and even more preferably, from about 20 to about 35 weight %. Furthermore, after hydrolysis and condensation, the overall solids concentration of the compositions are from about 5 wt % to about 50 wt %, preferably from about 15 wt % to about 30 wt %, and even more preferably from about 18 wt % to about 25 wt %.

The curable compositions of the present invention may further comprise other additives or compounds used traditionally in sol-gel curable compositions including: UV stabilizers and surfactants (for use, for example, as flow controlling agents). For example, the use of UV stabilizers and the use of polysiloxane-polyether surfactants in sol-gel preparations are described in U.S. Pat. No. 6,072,018 and U.S. Pat. No. 4,277,287, respectively, incorporated herein by reference.

According to certain preferred embodiments, the curable compositions of the present invention are prepared via sol-gel hydrolysis and co-hydrolysis reactions of the present amine compound and other optional alkoxysilyl or hydroxysilyl group-containing compounds. Procedures for sol-gel hydrolysis and co-hydrolysis reactions are known and involve, generally, reacting in a solvent, under acidic or basic conditions, compounds having alkoxysilyl or hydroxysilyl groups to form siloxane (—Si—O—Si—) bonds via silanol-silanol or silanol-alkoxysilane condensations.

While those of skill in the art will be readily able to adapt known sol-gel procedures for use in the present invention, applicants have discovered that curable compositions formed according to certain preferred embodiments of the present invention, wherein the composition comprises at least one present amine compound, at least one alkyltrialkoxysilane and at least one tetraalkoxysilane, have a surprisingly enhanced shelf life when the amine and tetraalkoxysilane are co-hydrolyzed in a first step, followed by co-hydrolysis of the alkyltrialkoxysilane compound with the pre-hydrolyzed present amine and tetraalkoxysilane mixture. In such preferred embodiments, the first step is performed under either acidic or basic conditions. The first step of the hydrolysis may be performed under acidic conditions by adding an amount of acid greater than the amount necessary to neutralize all of the amine groups present in the composition from the present amine compounds. If no acid, or an amount of acid insufficient to neutralize of the amine groups present in the composition, is used, the first step of the hydrolysis may occur under basic conditions.

The second step is performed subsequently by adding the alkyltrialkoxysilane compound to the hydrolyzed mixture with sufficient acid to bring the reaction pH to from about 1 to about 6 and preferably from about 3 to about 5. Although applicants do not wish to be bound by or to any theory of operation, it is believed that within the pH range of 3–5, the amine groups of the present amine compounds are mostly protonated by the acid to form ammonium ions. The ammonium ions tend to deter silanol or alkoxysilane groups in the same or adjacent clusters from approaching each other and collapsing into dense particles. The ammonium ions further deter excessive cluster growth which may lead to premature and undesirable system gelation. Upon heating during the curing process, the ammonium ions are converted back to amine groups thus catalyzing further silanol-silanol and silanol-alkoxysilane condensations.

It is further believed that the presence of the tetralkoxysilane and alkyltrialkoxysilane components may slow gelation of present compositions. Such components tend to react with the relatively large present amine compounds first to form compound clusters having silanol/alkoxysilane groups which have lower reactivity in acidic medium. As a result, the probability of reaction between two compound clusters decreases.

Coating Applications

The compositions of the present invention are useful in a number of applications, such as, for example, high technology areas as instrument panels, optical devices and equipment, coatings, laminates, films and glazing materials. Coatings derived from compounds of the present invention may be applied, for example, to nonporous continuous substrates, such as those of plastics, paints, metals and the like; polymer substrates, including, but not limited to, those comprising bisphenol-A polycarbonate, poly(methylmethacrylate), poly(diethylene glycol diallylcarbonate), and the like; metal substrates comprising, for example, aluminum, copper, brass, stainless steel and the like; as well as other substrates, to impart to them improved abrasion resistance or resistance against damage in corrosive environments. In certain preferred embodiments of the present invention, the compositions of the present invention may be used as glazing materials for building windows, automobiles, trains, and airplanes, as well as, polymeric prisms and lenses for optical instruments and eyeglasses.

As mentioned above, other aspects of the present invention provide a process for producing a coated substrate and the coated substrate derived therefrom. Generally, the method involves applying the curable composition of the invention onto a substrate and curing the curable composition on the substrate.

Any of a wide range of methods for applying the curable composition onto a substrate may be used according to the present invention. Suitable methods include, for example, dip coating, spin coating, draw bar coating, roll coating, solvent coating, extrusion coating, spray coating and the like. Preferred methods for applying include dip coating and spin coating.

In certain preferred embodiments, it is desirable to clean the substrate prior to the coating step to avoid the incorporation of impurities into the coating layer and at the substrate/coating interface. Any of a wide range of cleaning materials can be used to clean the substrate according to the present invention. For example, metal surfaces may be cleaned using liquids, such as acetone, 2-propanol and the like, or may be polished or sanded. Polymeric substrates may be cleaned using degreasing liquids such as 2-propanol and the like.

Additionally, according to certain preferred embodiments, adhesion-promoting substances may be applied to the substrate to promote better adhesion between the substrate and the coating material. For example, primers such as 3-aminopropyltriethoxysilane and the like may be used. The substrate may also be pretreated via plasma treatment processes, known in the art, to enhance the adhesion of the coating to the substrate.

In certain preferred embodiments, the curable composition is cured by exposing the composition to heat. As will be readily appreciated, the composition may be cured using an oven or by exposure to another heat source. While the preferred embodiment involves heat-curing the curable composition, one skilled in the art will appreciate that many variations of the method within the scope of the claims is possible depending on the nature of the curable composition. For example, if desired, the curing of the curable composition may be accelerated using microwave treatment procedures known in the art.

The present invention also provides for a coating or film formed by curing a curable composition of the present invention.

EXAMPLES

In order that the invention may be more readily understood, reference is made to the following examples which are intended to be illustrative of the invention, but are not intended to be limiting in scope.

In the following Examples, the abrasion resistance of the coatings is evaluated using two types of Taber tests. The first is a 1000-cycle Taber test (ASTM D 4060) involving a pair of CS10F wheels, 500 g load per wheel. Square substrates (4 in×4 in×1/16 in) of bisphenol-A polycarbonate are used as substrates for the tests. The haze (ASTM D 1044 and ASTM D 1003) increase of the substrate after the Taber test is used as an index for the abrasion resistance of the coating.

The second type of Taber test involves 500 cycles of abrasion using a pair of CS10 wheels (a harsher type than CS10F), 500 g load per wheel. In this test, both the haze and transparency of the wear track with respect to the unabraded regions are used as indices for abrasion resistance. The transparency is measured using a Shimadzu CS-9000 UV-VIS scanner by scanning a 420 nm light beam (0.1×10 mm$^2$ in size) across the wear track. The difference of the absorbance between the wear track and unabraded regions is measured and then converted to the transparency value.

Example 1

This example illustrates the preparation of trimethoxysilylated ethylenediamine.

Ethylenediamine (10.0 g, 99.5%, Aldrich), 3-glycidoxypropyltrimethoxysilane (156.0 g, 98%, Aldrich), and 156.0 grams of absolute ethanol are mixed in a 1000 ml Erlenmeyer flask. The flask is capped with a septum to avoid hydrolysis of the 3-glycidoxypropyltrimethoxysilane by moisture, and the mixture is stirred at room temperature for 24 hours. A condenser is attached to the Erlenmeyer flask and a bubbler with mineral oil is attached to the top of the condenser to prevent direct contact of the reaction mixture with air. The bottom of the Erlenmeyer flask is submerged in a silicone oil bath on top of a heating/stirring plate and the temperature of the bath is controlled to 60° C. After 48 hours of stirring at this temperature, the polyaddition reaction in the flask is substantially finished. The final product is a solution (colorless to slightly yellow) of trimethoxysilylated ethylenediamine in ethanol (with a trace amount of methanol). The solution is stored in a closed container and maintained effectively for months. Evaporation of the solvent or diluting with a non-alcoholic organic solvent often causes polymerization of this compound.

Example 2

This example illustrates the preparation of triethoxysilylated 1,3-bis(3-aminopropyl)-tetramethyldisiloxane.

1,3-bis(3-aminopropyl)tetramethyldisiloxane (10.0 g, Gelest), 3-glycidoxypropyltrimethoxysilane (38.0 g, 98%, Aldrich), and 48.0 grams of absolute ethanol are mixed in a 500 ml Erlenmeyer flask at room temperature. The mixture is treated using the same process as described in Example 1. The final product is a solution (50 wt %) (colorless to slightly yellow) of triethoxysilylated 1,3-bis(3-aminopropyl)-tetramethyldisiloxane in ethanol (with a trace amount of methanol). Its chemical properties are similar to those of trimethoxysilylated ethylenediamine and the product is similarly stored in a closed container for future coating formulation.

Example 3

This example illustrates the preparation of trimethoxysilylated hexamethylenediamine.

Hexamethylenediamine (11.6 g, 98%, Aldrich), 3-glycidoxypropyltrimethoxysilane (94.6 g, 98%, Aldrich), and 118 grams of absolute ethanol are mixed in a 500 ml Erlenmeyer flask at room temperature. The mixture is treated using the same process as described in Example 1. The resulting product is a colorless to slightly yellow solution (50 wt %) of trimethoxysilylated hexamethylenediamine in ethanol (with a trace amount of methanol). The chemical properties and storage of this product are similar those in Examples 1 and 2.

Example 4

This example illustrates the preparation of a coating composition of the present invention comprising trimethoxysilylated ethylenediamine.

5.0 grams of TMOS, 4.0 grams of trimethoxysilylated ethylenediamine (as prepared in Example 1), 2.0 grams of ethanol, and 2.0 grams of water are mixed in a 50 ml Erlenmeyer flask. As the mixture is quickly stirred using a magnetic stirrer, about 3.5 grams of 1 M hydrochloric acid are added dropwise so that the final pH is in the range of about 3 to about 5. After 30–60 minutes, 2.0 grams of $C_6H_5Si(OCH_3)_3$ are added in the pre-hydrolyzed solution. The mixture is stirred until a homogeneous solution is formed. A coating composition is obtained after 5–6 hours of reaction. At room temperature, this composition has a shelf life up to about 2 weeks.

The composition is applied on square substrates as described above, and the coatings are cured at 125° C. for 2 hrs. In the 1000-cycle Taber test, these coatings have an abrasion resistance index of 1.2% (in haze). In the 500-cycle Taber test, the haze index is 3.2%.

Example 5

This example illustrates the preparation of a coating composition of the present invention comprising trimethoxysilylated 1,3-bis(3-aminopropyl)tetramethyldisiloxane.

5.0 grams of TMOS, 4.0 grams of trimethoxysilylated 1,3-bis(3-aminopropyl)tetramethyldisiloxane (as prepared in Example 2), 2.0 grams of ethanol, and 2.0 grams of water are mixed in a 50 ml Erlenmeyer flask. Subsequently about 3.5 grams of 1 M hydrochloric acid are added so that the final pH is in the range of from about 3 to about 5. After 5–6 hours, 2.0 grams of $C_5H_5Si(OCH_3)_3$ are added to this pre-hydrolyzed TMOS solution. After 5–6 hours of reaction with TMOS, a coating composition is obtained. At room temperature, this composition has a shelf life up to about 2 weeks.

The composition is applied on square substrates as described above, and the coatings are cured at 125° C. for 2 hrs. In the 1000-cycle Taber test, these coatings have an abrasion resistance index of 2.2% (in haze). In the 500-cycle Taber test, the haze index is 4.1%.

Example 6

This example illustrates the preparation of a coating composition of the present invention comprising trimethoxysilylated hexamethylenediamine.

5.0 grams of TMOS, 4.0 grams of compound F (as prepared in Example 3), 2.0 grams of ethanol, and 2.0 grams of water are mixed in a 50 ml Erlenmeyer flask and then about 3.5 grams of 1 M hydrochloric acid are added so that the final pH is in the range of 3–5. After 30–60 minutes, 2.0 grams of $C_5H_5Si(OCH_3)_3$ are added to this pre-hydrolyzed TMOS solution. A coating composition is obtained after 5–6 hours of further reaction. At room temperature, this composition has a shelf life up to 2 weeks.

The composition is applied on square substrates as described above, and the coatings are cured at 125° C. for 2 hrs. In the 1000-cycle Taber test, these coatings have an abrasion resistance index of 1.2% (in haze). In the 500-cycle Taber test, the haze index is 3.0%

Example 7

This example illustrates the preparation of three coating compositions containing trimethoxysilylated ethylenediame and three different concentrations of TMOS.

Three 50 ml Erlenmeyer flasks are charged with 5.0, 3.8 and 2.8 g of TMOS, respectively. Trimethoxysilylated ethylenediame (4.0 g) (as prepared in Example 1), 2.0 g of ethanol, and 2.0 g of water are added to each flask to form a mixture. Each mixture is stirred with a magnetic stirrer, and about 3.5 g of 1.0 M hydrochloric acid are added dropwise using a pipet so that the final pH of each mixture is in the range of 3–5. After 30–60 min of reaction, 2.0 g of $PhSi(OCH_3)_3$ are added to the pre-hydrolyzed mixtures. Three coating compositions are obtained after another 5–6 hrs of reaction. These three compositions are labeled f-EPOXY5.0, f-EPOXY3.8 and f-EPOXY2.8, respectively, according to the concentration of TMOS concentration. They have a shelf life up to 2–4 weeks at room temperature.

The three compositions are applied on square substrates and tested as described above. Table 1 lists curing conditions and abrasion resistance test results based on the 500-cycle Taber tests.

TABLE 1

| Composition | Curing Condition | Transparency % |
| --- | --- | --- |
| f-EPOXY 5.0 | 125° C./2 hrs | 97.9 |
| f-EPOXY 3.8 | 125° C./2 hrs | 97.6 |
| f-EPOXY 2.8 | 125° C./2 hrs | 97.2 |

Example 8

This example illustrates coating compositions containing trimethoxysilylated ethylenediamine and different concentrations of phenyltrimethoxysilane.

A 100 ml Erlenmeyer flasks is charged with 13.6 g of tetraethoxysilane, 4.0 g of trimethoxysilylated ethylenediamine (as prepared in Example 1), 8.0 g of ethanol, and 6.0 g of water. The mixture is stirred using a magnetic stirrer at room temperature for 24–48 hours to undergo basic hydrolysis. Then the pre-hydrolyzed mixture is divided into two equal parts. To a first part, 2.0 g of trimethoxysilylated ethylenediamine and 2.0 g of phenyltrimethoxysilane is added. To a second part, 2.0 g of trimethoxysilylated ethylenediamine and 4.0 g of phenyltrimethoxysilane is added. While each part is rigorously stirred, about 3.5 g of 1 M hydrochloric acid are added dropwise to each part using a pipet. Two coating compositions are obtained after the mixtures were stirred at room temperature for another 5–6 hrs. These compositions are colorless solutions and have a shelf life up to 2–4 weeks at room temperature.

The two compositions are applied on bisphenol-A polycarbonate substrates as described above and cured at 100° C. for 3 hrs or 125° C. for 2 hrs. The following Table lists the abrasion resistance results based on the 500-cycle Taber test (CS 10 wheels, 500 g load per wheel).

| Compositions | Curing ConditionS | Transparency % |
| --- | --- | --- |
| Part 1 | 100° C./3 hrs | 96.7 |
|  | 125° C./2 hrs | 98.4 |
| Part 2 | 100° C./3 hrs | 94.0 |
|  | 125° C./2 hrs | 96.4 |

Example 9

This example illustrates the preparation of curable compositions containing trimethoxysilylated ethylenediamine and different concentrations of methyltrimethoxysilane.

A 100 ml Erlenmeyer flask is charged with 13.6 g of tetraethoxysilane, 4.0 g of trimethoxysilylated ethylenediamine (as prepared in Example 10), 12.0 g of 1-methoxy-2-propanol, and 6.0 g of water and 4.0 g of ethanol. The mixture is stirred (with a magnetic stirrer) at room temperature for 24–48 hrs to undergo basic hydrolysis and a viscous milky liquid is obtained. The milky liquid is divided into two equal parts. To a first part is added 2.0 g of trimethoxysilylated ethylenediamine and 2.0 g of methyltrimethoxysilane. To a second part is added 2.0 g of trimethoxysilylated ethylenediamine and 4.0 g of methyltrimethoxysilane. About 3.5 g of 1 M hydrochloric acid are added, dropwise using a pipet, to each part with rigorous stirring. Two milky coating compositions are obtained after 5–6 hours of reaction. At room temperature, part 1 has a shelf life up to about 7–8 days, while part 2 has a shelf life of at least about 4 weeks.

The two compositions are applied on bisphenol-A polycarbonate substrates as described above and cured at 80° C. for 3 hrs, 100° C. for 3 hrs, or 125° C. for 2 hrs to obtain highly transparent coatings. The following Table lists the abrasion resistance results based on the 500-cycle Taber test (CS 10 wheels, 500 g load per wheel).

| Compositions | Curing ConditionS | Transparency % |
|---|---|---|
| Part 1 | 80° C./3 hrs | 96.7 |
| | 100° C./3 hrs | 97.8 |
| | 125° C./2 hrs | 99.2 |
| Part 2 | 80° C./3 hrs | 84.9 |
| | 100° C./3 hrs | 92.5 |
| | 125° C./2 hrs | 98.1 |

Example 10

This example compares a coating composition containing trimethoxysilylated ethylenediamine and phenyltrimethoxysilane to a composition containing trimethoxysilylated ethylenediamine and methyltrimethoxysilane.

A 100 ml Erlenmeyer flask is charged with 27.2 g of tetraethoxysilane, 16.0 g of trimethoxysilylated ethylenediamine (as prepared in Example 1), 24.0 g of 1-methoxy-2-propanol, 12.0 g of water, and 6.0 g ethanol. The mixtures are stirred via magnetic stirrer at room temperature to undergo basic hydrolysis. A slightly milky liquid is obtained after 48 hrs. The milky liquid is divided into two equal parts. To a first part, 4.0 g of methyltrimethoxysilane are added. To a second part, 4.0 g of phenyltrimethoxysilane are added. Each mixture is quickly stirred at room temperature, and about 7 grams of 1 M hydrochloric acid are added dropwise using a pipet to each part until the pH is in the range of 3–5. After another 5–6 hrs of reaction, two coating compositions are obtained. At room temperature, these compositions have a shelf life of at least about 4–6 weeks.

The two compositions are applied on bisphenol-A polycarbonate substrates as described above and cured at 125° C. for 2 hours. The following Table lists the abrasion resistance results based on the 500-cycle Taber test (CS 10 wheels, 500 g load per wheel).

| Compositions | Curing Conditions | Transparency % |
|---|---|---|
| Part 1 | 100° C./3 hr | 97.8 |
| | 125° C./2 hrs | 99.3 |
| Part 2 | 100° C./3 hr | 95.2 |
| | 125° C./2 hrs | 97.5 |

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. An amine compound described by the Formula 2:

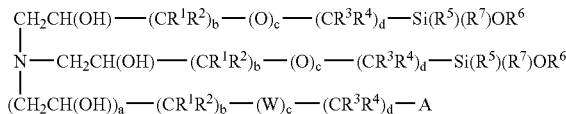

(2)

wherein

W is independently

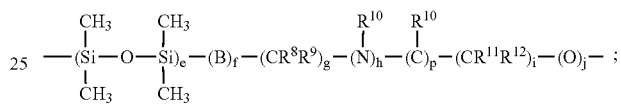

X and Y are independently hydrogen or lower alkyl, or independently X and Y axe linked to form a cycloalkyl moiety;

$R^{10}$ is independently —$(CR^{13}R^{14})_k$—(O)$_l$—$(CR^{15}R^{16})_m$-A;

A is independently lower alkyl or —Si($R^5$)($R^7$)O$R^6$;

B is independently oxygen, —O—$(CR^{17}R^{18})_n$—O—, a substituted or unsubstituted cycloalkylene radical, a substituted or unsubstituted arylene radical, a substituted or unsubstituted aralkylene radical, wherein any of said cycloalkylene, arylene or aralkylene radicals may be further substituted with N, O, or S heteroatoms;

$R^5$ and $R^7$ are independently hydroxyl, lower alkyl or lower alkoxy;

$R^6$ is independently methyl or ethyl;

$R^1$, $R^2$, $R^3$, $R^4$, $R^8$, $R^9$, $R^{11}$, $R^{12}$, $R^{13}$, $R^{14}$, $R^{15}$, $R^{16}$, $R^{17}$ and $R^{18}$ are independently hydrogen, hydroxyl, lower alkyl or lower alkoxy;

a is I;

c, f, h, j, l and p are independently 0 or 1;

g, i, k, m and n are independently from 0 to 8; and b and d are from 1 to 6.

2. The compound of claim 1 further described by the Formula 3:

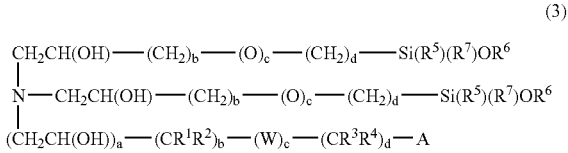

(3)

wherein b and d are independently from 1 to about 6.

3. An amine compound described by the Formula 4:

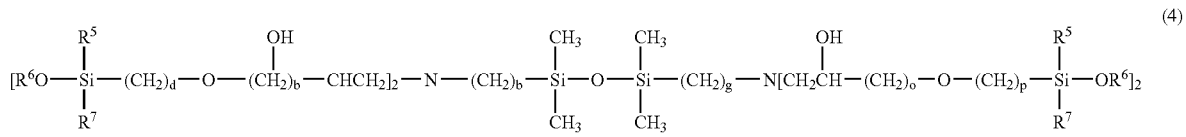

wherein
$R^5$ and $R^7$ are independently hydroxyl, lower alkyl, or lower alkoxy;
$R^6$ is independently methyl or ethyl; and
b, d, g, o and p are independently from 1 to 6.

4. An amine compound described by the Formula 8:

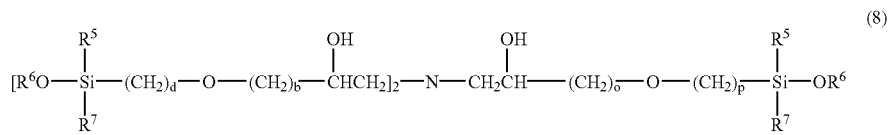

wherein
$R^5$ and $R^7$ are independently hydroxyl, lower alkyl, or lower alkoxy;

$R^6$ is independently methyl or ethyl; and b, d, o and p are independently from 1 to 6.

5. The compound of claim 2 further described by the Formula 10:

wherein b, d, and o are independently about 1 to about 6.

6. A curable composition comprising a compound of claim 1 and water.

7. The compound of claim 4 further described by the formula:

$N[CH_2CH(OH)CH_2OCH_2CH_2CH_2Si(OCH_3)_3]_3$.

* * * * *